A. STAPLES.
Sewer Trap.
No. 232,376. Patented Sept. 21, 1880.
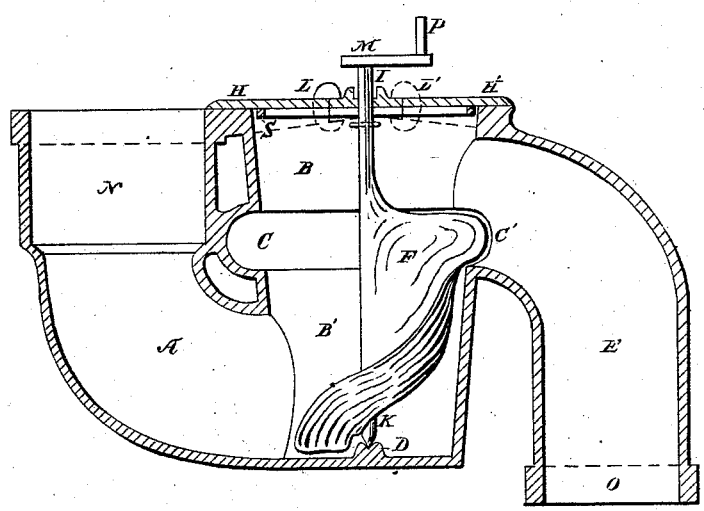
Witnesses.
John S. Searle
Irving S. Porter
Inventor.
Arthur Staples,
By Albert M. Moore,
His Attorney.

UNITED STATES PATENT OFFICE.

ARTHUR STAPLES, OF LOWELL, MASSACHUSETTS.

SEWER-TRAP.

SPECIFICATION forming part of Letters Patent No. 232,376, dated September 21, 1880.

Application filed October 30, 1879.

*To all whom it may concern:*

Be it known that I, ARTHUR STAPLES, of Lowell, in the county of Middlesex and Commonwealth of Massachusetts, have invented certain Improvements in Sewer-Traps, of which the following is a specification.

My invention consists in the improvements in sewer-traps hereinafter described, the general objects of which improvements are to enable such traps to be cleaned with slight trouble, and also to be cleaned without opening the same, and also to allow of such traps having at all times a water-seal of comparatively clean water.

In the accompanying drawing, which represents a longitudinal vertical section of a trap to which my invention is applied, A and E are, respectively, the pipes through which the water enters and leaves the trap. Between these pipes is a basin, B, the diameter of which is larger than the diameter of the outlet or inlet pipes, and which is here represented as of the form of the frustum of an inverted cone, but which may be cylindrical or of any other form, provided its horizontal cross-sections are round.

C is an annular internal space or offset just at the bottom of the outlet of the basin—that is to say, just at the top of the water-seal. The basin B is closed at the top by a circular cover, H, held in place by means of hooks L L', cast on opposite sides or edges of said cover, or otherwise attached to said cover, and reaching below wedge-shaped flanges cast on the outside of the basin at the top of the same, and slotted vertically at their thinnest parts to allow the hooks to be passed over them. This means of securing covers is, however, not new. The joint between the cover and the basin is made air-tight by putty, and the cover is then turned partly around, and thereby drawn down by the wedges on the basin. A circular rib or shoulder, S, on the bottom of the cover serves to center the cover and the basin.

Through the center of the cover H runs the upright shaft M of the agitator F, the lower end of said agitator terminating in a point, K, which enters a conical hole in the top of the stud D on the top of the bottom of the basin.

The blade of the agitator is of spiral shape and is provided with an ear, C'. The agitator is turned by a crank, P, secured to its shaft M, or by a wrench or suitable means.

A stuffing-box, I, cast on the cover and surrounding the shaft of the agitator, is properly packed to prevent the escape of gases from the basin.

It is well known that traps occasionally get filled up to the water-line by deposits of sand and dirt, which stop the flow of water through the traps, and which, therefore, require to be cleaned out—a task accomplished with considerable difficulty, owing to the fact that these deposits are not usually immediately below the hand-hole—that is, the hole through which the hand or some instrument is introduced into the trap to clean the latter—and that the hand-hole is too small in small pipes or traps. The enlarged basin makes it much easier to clean the trap by ordinary methods; but, furthermore, by providing the trap with an agitator the trap can be cleaned without being opened, inasmuch as by turning the crank P the agitator will remove any deposits that may have formed in the bottom of the basin, and (owing to the spiral form of the agitator) will raise them to the exit of the pipe E, so that they will be carried out of the trap by centrifugal force.

The offset C is made in order that grease, which sometimes forms a scum on the top of the water in the trap, being broken in pieces, may be carried by the centrifugal action of the water (impelled by the agitator) into the offset, and thrown by the ear C' into the outlet-pipe.

The invention above described renders it possible to clean a trap without opening the same, and therefore without allowing offensive gases to escape.

The water in the trap itself frequently generates offensive and unwholesome gases within the inlet-pipe; but by my invention the trap may be made to contain only comparatively clean water.

The general principle of about all the sewer-traps in use, whether called "running," "J," "P," or "S" traps, is to let the water into the trap at a point below that at which the water leaves the trap, so that the water may stand in the trap at all times above the mouth of the inlet, and thus make a water-seal to prevent the gases from escaping into the inlet-pipe.

To all these varieties of traps my invention may be applied with advantage.

I claim as my invention—

1. The sewer-trap provided with the basin B, in combination with the rotary agitator F, as and for the purpose specified.

2. The sewer-trap provided with the basin B, in combination with the spiral agitator F, as and for the purpose specified.

3. The sewer-trap provided with the basin B, having the offset C, in combination with the agitator F, provided with the ear C', as and for the purpose specified.

4. In combination with a sewer-trap, a spiral agitator, F, as and for the purpose specified.

5. In combination with a sewer-trap provided with the offset C, the agitator F, provided with the ear C', as and for the purpose specified.

6. The combination of the sewer-trap provided with the stuffing-box I and the agitator F, as and for the purpose specified.

ARTHUR STAPLES.

Witnesses:
ALBERT M. MOORE,
IRVING S. PORTER.